(12) United States Patent
Sachdev et al.

(10) Patent No.: US 11,549,626 B2
(45) Date of Patent: Jan. 10, 2023

(54) METHOD OF FORMING A COOLING PLATE

(71) Applicant: GM GLOBAL TECHNOLOGY OPERATIONS LLC, Detroit, MI (US)

(72) Inventors: Anil K. Sachdev, Rochester Hills, MI (US); Arianna T. Morales, Bloomfield Hills, MI (US); Jason Mazza, Royal Oak, MI (US); Andrew C. Bobel, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 777 days.

(21) Appl. No.: 16/443,017

(22) Filed: Jun. 17, 2019

(65) Prior Publication Data

US 2020/0393069 A1 Dec. 17, 2020

(51) Int. Cl.
*F16L 37/06* (2006.01)
*B23P 15/26* (2006.01)
*F16L 55/165* (2006.01)
*B23K 20/12* (2006.01)

(52) U.S. Cl.
CPC .......... *F16L 37/06* (2013.01); *B23K 20/1235* (2013.01); *B23P 15/26* (2013.01); *F16L 55/1654* (2013.01)

(58) Field of Classification Search
CPC .............. B23K 20/1235; B23K 26/206; B23K 2101/14; B23K 2103/04; B23K 2103/10; B23K 2103/15; B23K 26/244; B21D 53/045; B23P 15/26; F28D 1/035; F28D 2021/0043; F28D 2021/0029; F28F 3/12; F28F 2275/067; F16L 37/06; F16L 55/1654; H01M 8/0267; H01M 2250/20; Y02E 60/50; Y02T 90/40
See application file for complete search history.

(56) References Cited

U.S. PATENT DOCUMENTS

2017/0106625 A1    4/2017  Sachdev et al.
2018/0266738 A1*   9/2018  Li ................ F28D 15/0233
2019/0366877 A1*  12/2019  Blersch ............. H01M 10/613

FOREIGN PATENT DOCUMENTS

DE   102017202552 A1 *  8/2018  ........... B23K 1/0012
JP      S58128236 A  *  7/1983  ........... B21D 53/045

OTHER PUBLICATIONS

Machine Translation of JPS58128236A (Year: 1983).*

* cited by examiner

*Primary Examiner* — David P Bryant
*Assistant Examiner* — Christine Bersabal
(74) *Attorney, Agent, or Firm* — Cantor Colburn LLP

(57) ABSTRACT

In an embodiment, a method of forming a cooling plate, comprises laser welding a plurality of weld lines to physically connect a first substrate and a second substrate wherein the plurality of weld lines forms an inflatable track; and inflating the inflatable track with an inflation fluid to form a cooling channel in the cooling plate. In another embodiment, the cooling plate can comprise a first substrate and a second substrate and a plurality of weld lines can form a fluid tight seal for a cooling channel located therebetween.

17 Claims, 7 Drawing Sheets

METHOD OF FORMING A COOLING PLATE

INTRODUCTION

Electrical systems within vehicles, such as hybrid, electric, and fuel cell vehicles, have advanced in complexity and power usage, relying in part on large batteries to store energy. Energy flowing into the battery or being discharged from the battery to power the vehicle and its accessories causes heating in the battery cells, where the higher the current flow, the greater the heating effect. Unfortunately, the increased heat in the battery assembly can disadvantageously impact its performance. Cooling systems are therefore provided in battery packs to maintain a particular operating temperature or temperature range of the battery. These cooling systems, however, can present high manufacturing costs and can add a significant amount of weight to the battery. Moreover, the high temperatures of the conventional forming processes result in cooling plates with reduced mechanical properties.

Accordingly, it is desirable to provide an improved cooling system.

SUMMARY

In one exemplary embodiment a method of forming a cooling plate, comprises laser welding a plurality of weld lines to physically connect a first substrate and a second substrate wherein the plurality of weld lines forms an inflatable track therebetween. The inflatable track can then be inflated with an inflation fluid to form a cooling channel in the cooling plate.

In addition to one or more of the features described herein, the method can comprise stacking the first substrate and the second substrate in between a support layer and a laser guide layer. The laser guide layer can comprise an open track forming a laser guide. The laser welding can comprise laser welding along the laser guide.

In addition to one or more of the features described herein, the method can comprise applying a compressive force during the laser welding to the first substrate and the second substrate via the support layer and the laser guide layer.

In addition to one or more of the features described herein, the inflation fluid can comprise at least one of a gas or a liquid.

In addition to one or more of the features described herein, the inflation fluid can have a temperature of 23 to 1,000° C.

In addition to one or more of the features described herein, the inflating can occur an inflation pressure of 10 to 100 psi.

In addition to one or more of the features described herein, the inflating can comprise inflating a free-standing welded substrate.

In addition to one or more of the features described herein, the inflating can comprise inflating the welded substrate in an inflation device comprising a first platen and a second platen located on either side of the welded substrate. At least one of the first platen or the second platen comprises an inflation track can correspond to the inflatable track.

In addition to one or more of the features described herein, the inflating can comprise utilizing an exhaust valve with constriction to provide a back pressure during the inflating.

In addition to one or more of the features described herein, at least one of the first substrate or the second substrate can comprise at least one of aluminum, magnesium, or steel.

In addition to one or more of the features described herein, at least one of the first substrate or the second substrate can comprise a partially recrystallized aluminum.

In addition to one or more of the features described herein, the cooling channel can have at least one of a channel width of 1 to 60 millimeters or a channel height of 1 to 6 millimeters.

In addition to one or more of the features described herein, at least one of the first substrate or the second substrate can have a thickness of 0.05 to 10 millimeters.

In addition to one or more of the features described herein, one of the first substrate or the second substrate can comprise a raised portion and the other of the first substrate and second substrate can be flat.

In addition to one or more of the features described herein, the first substrate can comprise a first raised portion and the second substrate can comprise a second raised portion.

In addition to one or more of the features described herein, the first raised portion and the second raised portion can be co-localized to form the cooling channel in at least an area of the cooling plate.

In addition to one or more of the features described herein, the first raised portion and the second raised portion can be not co-localized, forming separate cooling channels in at least an area of the cooling plate.

In addition to one or more of the features described herein, a cooling plate formed. The cooling plate can comprise a first substrate and a second substrate. A plurality of weld lines can form a fluid tight seal for a cooling channel located therebetween.

In addition to one or more of the features described herein, the cooling plate can have an increased tensile strength as compared to a comparative cooling plate comprising the same materials and having the same cooling channel but that was formed by molding and brazing.

In yet another exemplary embodiment, a battery can comprise the cooling plate. The cooling plate can comprise a first substrate and a second substrate. A plurality of weld lines can form a fluid tight seal for a cooling channel located therebetween.

The above features and advantages, and other features and advantages of the disclosure are readily apparent from the following detailed description when taken in connection with the accompanying drawings and claims.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
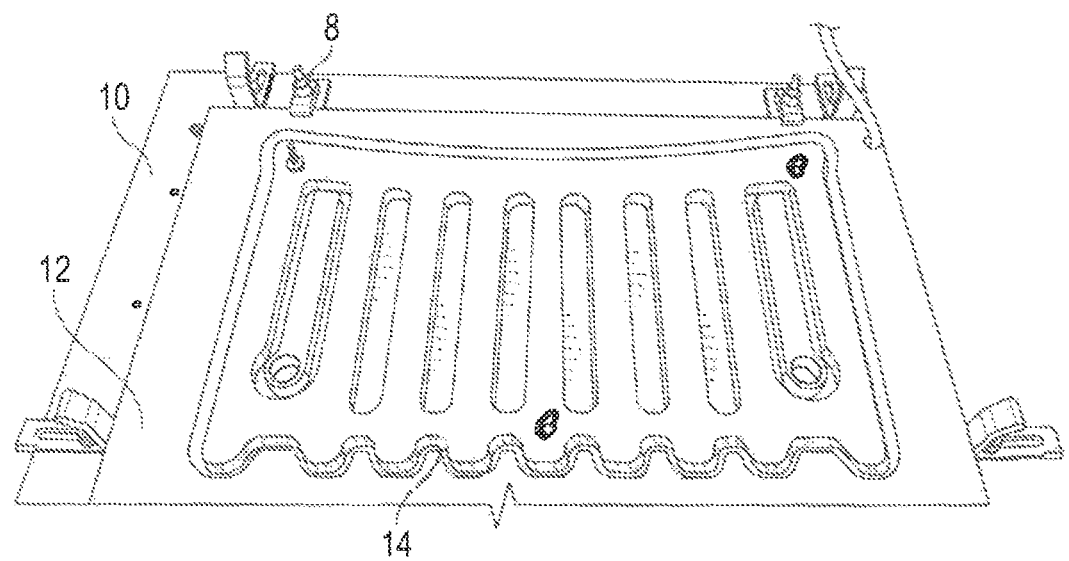
FIG. 1 is a top-down view of a laser welding device for forming a welded substrate.

The following description is merely exemplary in nature and is not intended to limit the present disclosure, its application or uses. It should be understood that throughout the drawings, corresponding reference numerals indicate like or corresponding parts and features.

Batteries often use cooling plates to help maintain the temperature of the battery within a desired range, thereby improving battery performance, minimizing the risk of failure, and reducing corrosive build-up. Cooling plates are generally formed from two metal substrates that are brazed or welded together via a high temperature weld to form a conduit for coolant flow. The bond strength between the respective metal plates that arises due to the brazing is extremely strong and is known to be capable of withstanding the normal pressure that the coolant exerts on the cooling plate during operation. However, the high temperatures of the conventional forming processes result in cooling plates with reduced mechanical properties as a result of softening at the high temperatures used for brazing that could cause fracture during use.

A new process of forming a cooling plate was discovered that does not rely on high temperature brazing. Specifically, the method of forming a cooling plate comprises laser welding a plurality of weld lines to physically connect a first substrate to a second substrate, or to a plurality of substrates, wherein the plurality of weld lines forms an inflatable track; and inflating the inflatable track to form the cooling plate comprising an inflated cooling channel. It was discovered that even after the inflation step, this method of laser welding and inflating the substrates can provide a fluid tight seal to prevent leakage of coolant between the first substrate and the second substrate during operation. This result was surprising as it was not previously thought that the laser welds could be capable of withstanding the inflation pressure while maintaining a sufficient bond to prevent coolant leakage during use. It was further discovered that since the present method does not comprise the brazing step, the present cooling plate can have an increased impact strength as compared to a cooling plate comprising the same materials and having the same cooling channel but that was formed by molding and brazing.

Various additional benefits and advantages are afforded by the present cooling plate. For example, a reduced cost is associated with using the laser welding instead of brazing. Furthermore, one or more of the metal substrates of the cooling plate can be replaced with polymeric substrates, which can further increase the cost reduction, result in a weight reduction of the battery, and improve voltage isolation as compared to other cooling plates.

In accordance with an exemplary embodiment, the cooling plate comprises a first substrate bonded via a laser weld to a second substrate or a plurality of substrates. At least one of the first substrate or the second substrate includes a raised portion that forms a cooling channel or conduit in the cooling plate for coolant flow. As used herein, the term "raised" is with respect to the cooling channel height perpendicular to the laser weld and to the plane of the cooling plate. The cooling channel defines a flow field for the coolant having one or more inlets and one or more outlets. The specific path of the cooling channel is not particularly limited. The laser weld provides a fluid tight seal to prevent leakage of coolant from the cooling channel to a bonded region proximal to the cooling channel area between the first substrate and the second substrate.

Figure 2:
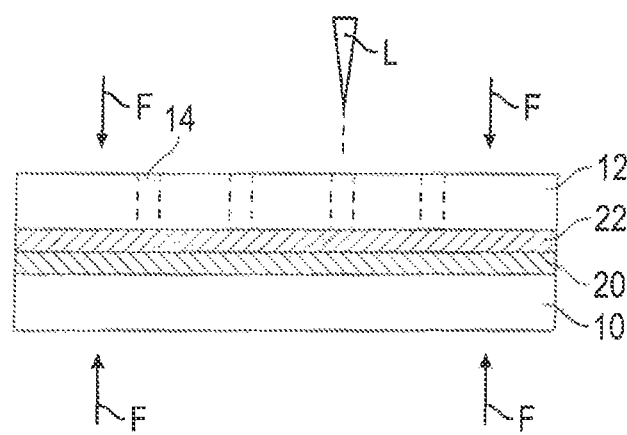
FIG. 2 is a cross-sectional view of a laser welding device for forming a welded substrate.
Figure 3:
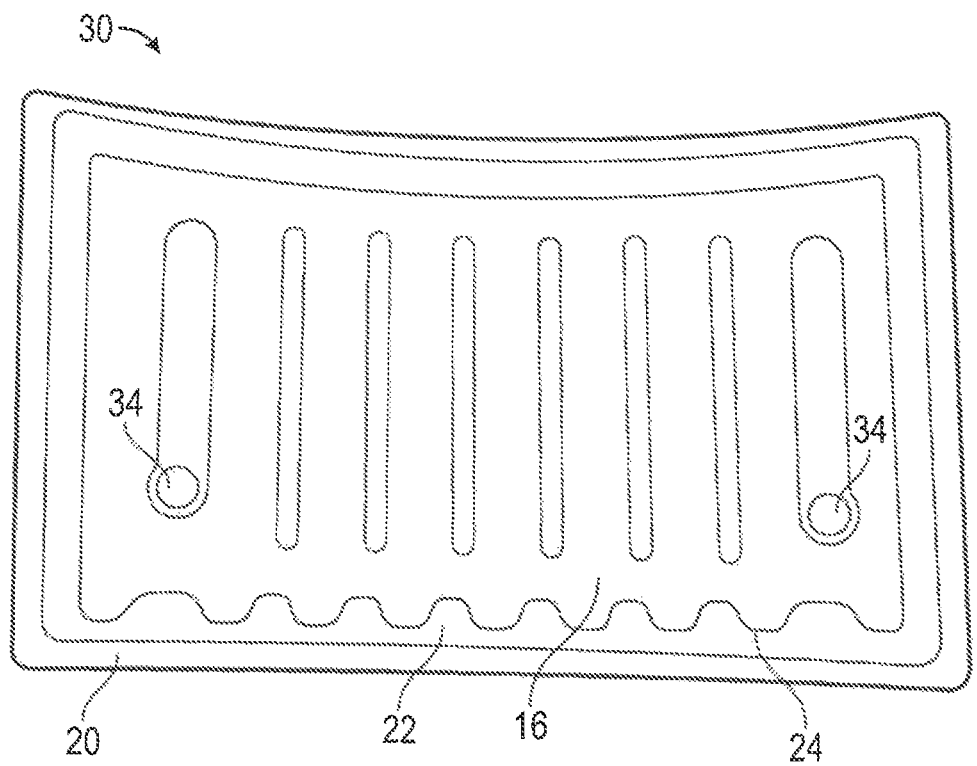
FIG. 3 is a top-down view of a welded substrate.

The method of forming the cooling plate comprises first laser welding the plurality of weld lines to physically connect the substrates. Referring to FIG. 1 and FIG. 2, these figures provide a top-down view and a cross-sectional view, respectively, of an embodiment of the laser welding device with two substrates. These figures illustrate that the first substrate 20 and the second substrate 22 can be stacked such that they are in physical contact with each other. The first substrate 20 and the second substrate 22 can be located in between a support layer 10 and a laser guide layer 12. The laser guide layer 12 comprises an open track forming a laser guide 14. The laser L can move along the laser guide 14 to weld the first substrate 20 and the second substrate 22 together and to form an inflatable track 16 as illustrated in FIG. 3. Although FIG. 2 illustrates the presence of only the first substrate 20 and the second substrate 22 it is noted that additional substrate layers can be present.

A force F can be applied to the support layer 10 and the laser guide layer 12 thereby compressing the first substrate 20 and the second substrate 22 to form a close physical contact therebetween. This close physical contact can facilitate the formation of the laser weld, ensuring that the weld is sufficiently strong to withstand the pressure associated with the inflation step as well as the pressures during normal operation of the cooling plate. The force F can be applied via a plurality of clamps 8, screws, or the like located around the edges of the support layer 10 and the laser guide layer 12. Conversely, the weight of the laser guide layer 12 can be sufficient to ensure the close physical contact of the first substrate 20 and the second substrate 22 to form the laser weld.

Figure 4:
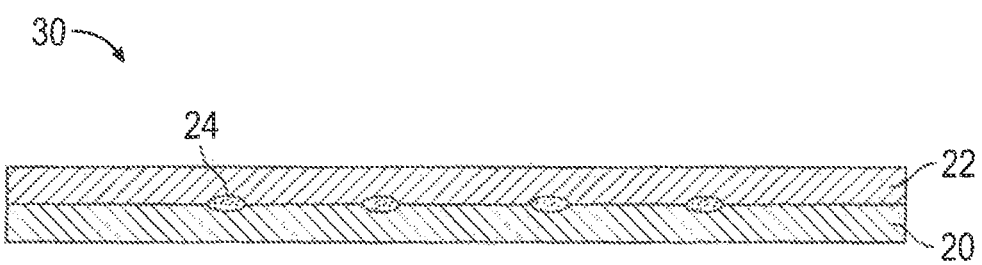
FIG. 4 is a cross-sectional view of a welded substrate.

FIG. 3 and FIG. 4 provide a top-down view and a cross-sectional view, respectively, of an embodiment of welded substrate 30 after the laser welding. These figures illustrate the formation of the laser weld 24 connecting the first substrate 20 and the second substrate 22. FIG. 3 illustrates that the welded substrate can comprise one or more alignment features 34. FIG. 4 illustrates that the topography of the first substrate 20 and the second substrate 22 is essentially flat, where it is understood that the term essentially flat refers to the overall topography of the first substrate 20 and the second substrate 22 being flat even though the area of the laser weld may have a local topography due to the laser welding step. It is further understood that the variables of the laser welding will depend on the specific substrates to be welded.

After the laser welding, the inflatable track 16 in the welded substrate 30 is inflated. The inflating can comprise inflating a free-standing welded substrate 30 to form the cooling plate. Conversely, an inflation device comprising neighboring platens, at least one of which comprises an inflation track can be used to guide the inflation.

Figure 5:
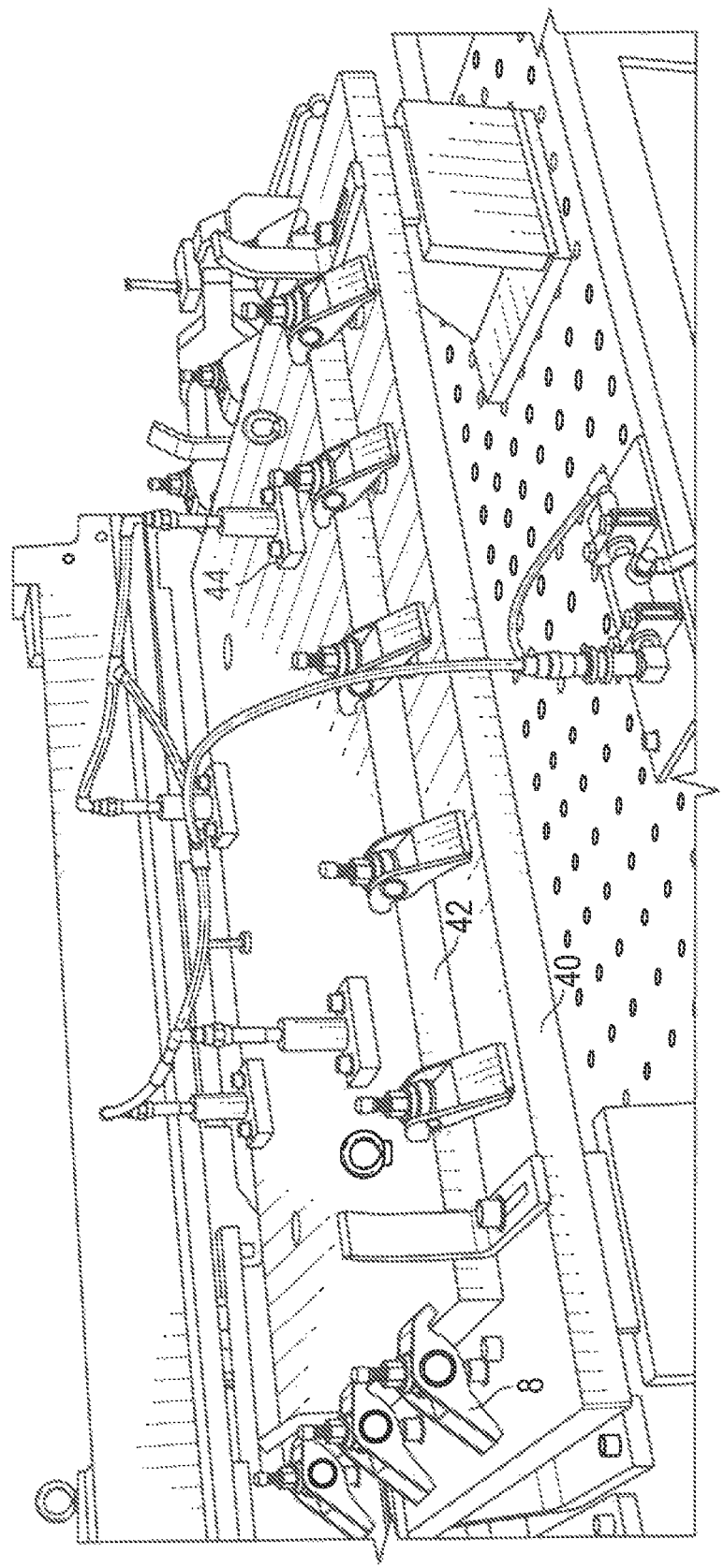
FIG. 5 is an isometric view of an inflation device for forming the cooling plate.
Figure 6A:
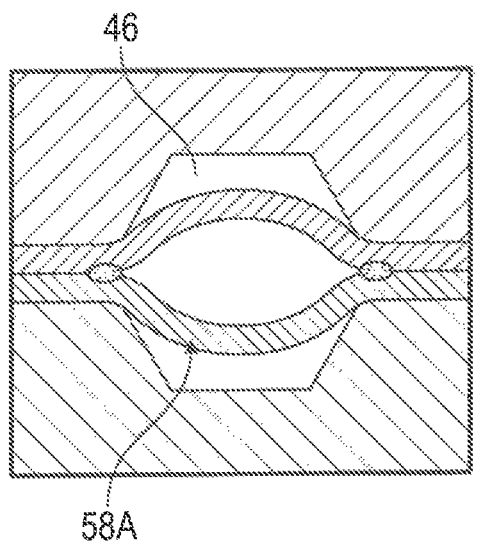
FIG. 6A is a cross-sectional view of an inflation device for forming the cooling plate.
Figure 6B:
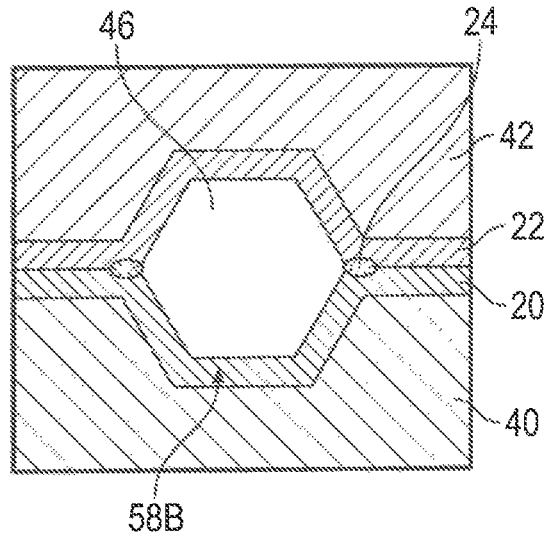
FIG. 6B is a cross-sectional view of an inflation device for forming the cooling plate.

FIG. 5, FIG. 6A, and FIG. 6B provide an isometric view of an inflation device and cross-sectional views of a section of an inflation device, respectively. FIG. 5 is an illustration of an inflation device, where the welded substrate 30 is located in between a first platen 40 and a second platen 42. At least one of the first platen 40 or the second platen 42 comprises an inflation track 46. For example, FIG. 6A and FIG. 6B are illustrations of scenario where both the first platen 40 and the second platen 42 comprise inflation tracks 46. The inflation track 46 can facilitate a controlled inflation of the cooling channel 58 in the assembled cooling plate 50. During the inflating, a compressive force can be exerted on the first platen 40 and the second platen 42, for example, via a plurality of clamps 8, screws, or the like.

FIG. 5 illustrates that one or more inflation nozzles 44 can be inserted into one or more corresponding inflation holes (not shown) and an inflation fluid can be introduced to the welded substrate, for example, by hydraulic metal forming. The inflation fluid can comprise a liquid (for example, water) or a gas (for example, air).

If the first platen 40 and the second platen 42 are used during the inflating, then an inflation track 46 located in at least one of the platens can have at least one of a corresponding channel width, a corresponding channel height, or a corresponding channel shape to that of the desired shape of the cooling channel Softening the substrate to be inflated (for example, by increasing its temperature) or by applying a greater force (for example, by increasing a pressure of the inflation fluid) can determine the extent to which the inflated cooling channel 58 conforms to the inflation track 46. For example, FIG. 6A and FIG. 6B illustrate that increasing at least one of the temperature or the pressure of the inflation fluid, the shape of the cooling channel can change from a more rounded shape of the rounded cooling channel 58A that does not expand completely to the surfaces of the inflation track 46 to a conformed shape of the conformed cooling channel 58B that extends to the surfaces of the inflation track 46. The inflation pressure can vary depending on the materials used. The inflation pressure can be 10 to 100 pounds per square inch. A temperature of the inflation fluid can be between room temperature (for example, 23 degrees Celsius (° C.)) to 1,000° C. depending on the material being inflated.

An exhaust valve with constriction can be used to provide sufficient back pressuring during the inflating. This feature can continuously exhaust fluid that has given up all of its sensible heat towards forming the cooling channel 58, while also replenishing heated fluid for further inflation.

The thicknesses of the substrates is not particularly limited as long as they can form the desired cooling channel. In an example, the first substrate 20 and the second substrate 22 can each independently have a thickness of 0.05 to 10 millimeters, or 0.5 to 5 millimeters. The respective thicknesses can be dependent upon the material used and on the inflation conditions. For example, a substrate having a thickness of 0.5 millimeters can form a cooling channel at a pressure of only 50 pounds per square inch, but a substrate having a thickness of 2 millimeters may not. The thicknesses of the respective substrates need not be the same, for example, one of the substrates can be thick enough that it does not deform under the inflation conditions.

Figure 7:
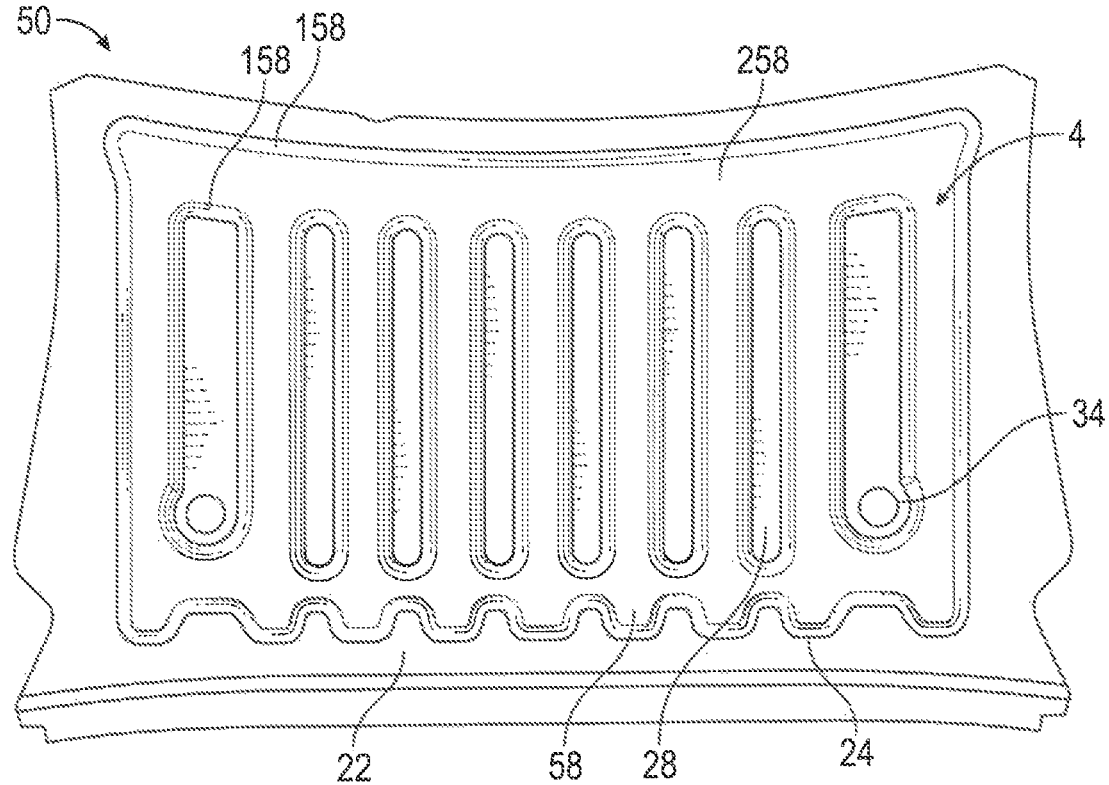
FIG. 7 is a top-down view of a cooling plate.
Figure 8:
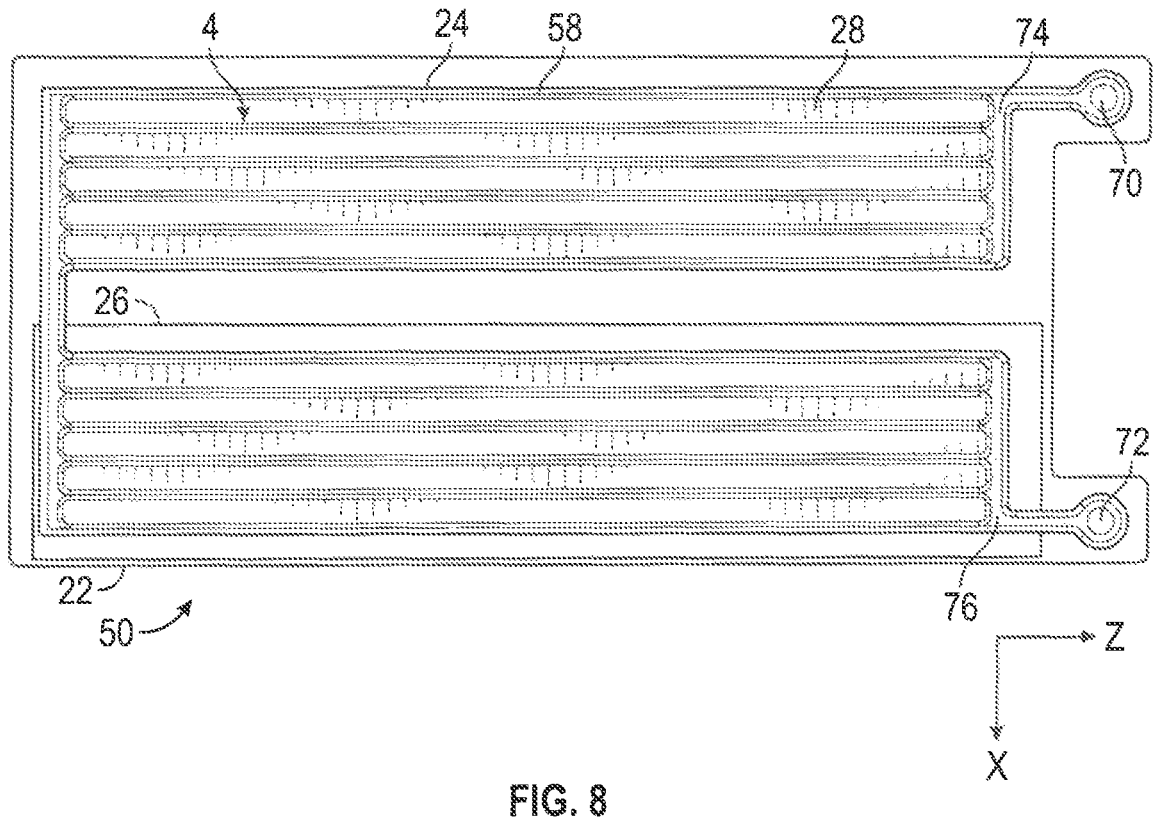
FIG. 8 is a top-down view of a cooling plate.

FIG. 7 and FIG. 8 provide top-down views of embodiments of cooling plate 50 after the inflating. FIG. 7 illustrates that the cooling plate 50 comprises the first substrate 20 (not shown) and the second substrate 22 connected to each other by a laser weld 24. The laser weld 24 provides an outline for the inflated cooling channel 58. The laser weld 24 can also provide an outline for one or more non-inflated regions 28 where flow of the coolant is not desired. In FIG. 7, the flow channels 58 start with a height of 0 from the laser weld 24 and increase in height in sloping regions 158 to a region of maximum height 258. It is understood that the combined sloping regions 158 and the region of maximum height 258 define the flow channels 58. FIG. 8 illustrates that an outer laser weld 26 can be selectively located around one or more perimeters of cooling channel 58 as an additional line of defense against leakage of the coolant from the cooling channel 58 during use.

As mentioned previously, although several figures illustrate the presence of only the first substrate 20 and the second substrate 22 it is noted that additional substrate layers can be present. The additional layers can be localized, for example, not spanning the entirety of the flow field 4 or can span the entirety of the flow field 4. The presence of additional layers can help define the relative amount of inflating or can enable more complex designs, for example, having multiple layers of flow channels 58.

Figure 9:
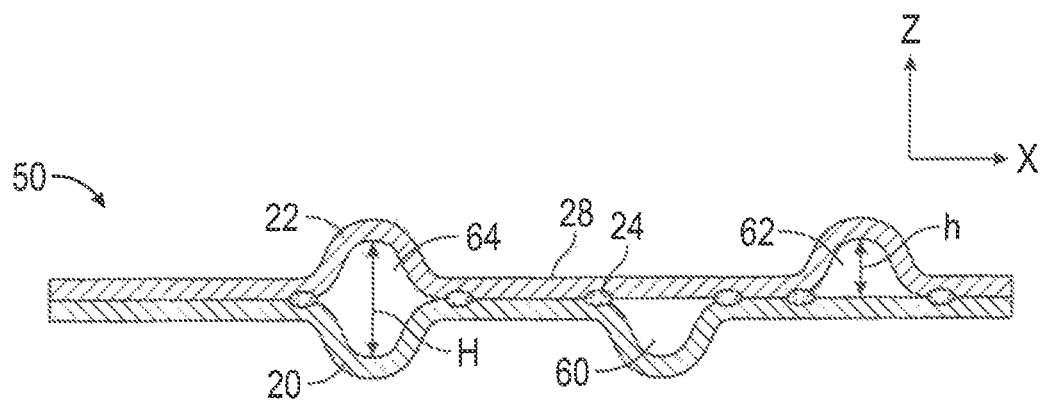
FIG. 9 is a cross-sectional view of a cooling plate.

FIG. 9 illustrates that the inflating can inflate the first substrate 20 to form a first single-sided channel 60 having a height h, the second substrate 22 to form a second single-sided channel 62 having a height h, or both the first substrate 20 and the second substrate 22 to form a double-sided channel 64 having a height H. The height h of the first single-sided channel 60 and the second single-sided channel 62 can be the same or different. The height can vary along the length of the cooling channel or can be constant. The cooling channel 58 can have a maximum channel height as illustrated as h or H in FIG. 9 of 1 to 6 millimeters, or 1 to 3 millimeters. The channel height is the height of the cooling channel 58 measured perpendicular to the flow direction in the Z direction from the opposing surfaces of the substrates 20 and 22.

Figure 11:
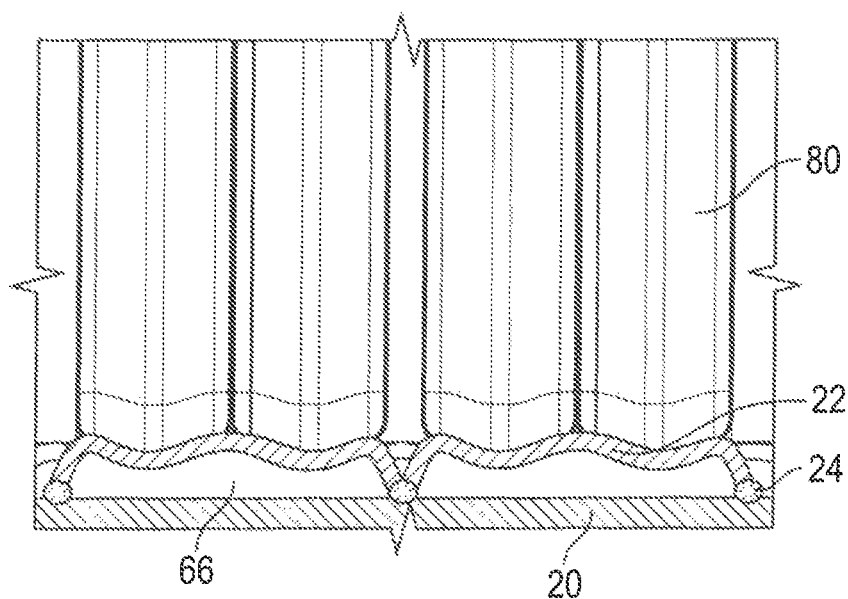
FIG. 11 is a cross-sectional view of a cooling plate in a battery.
Figure 12:
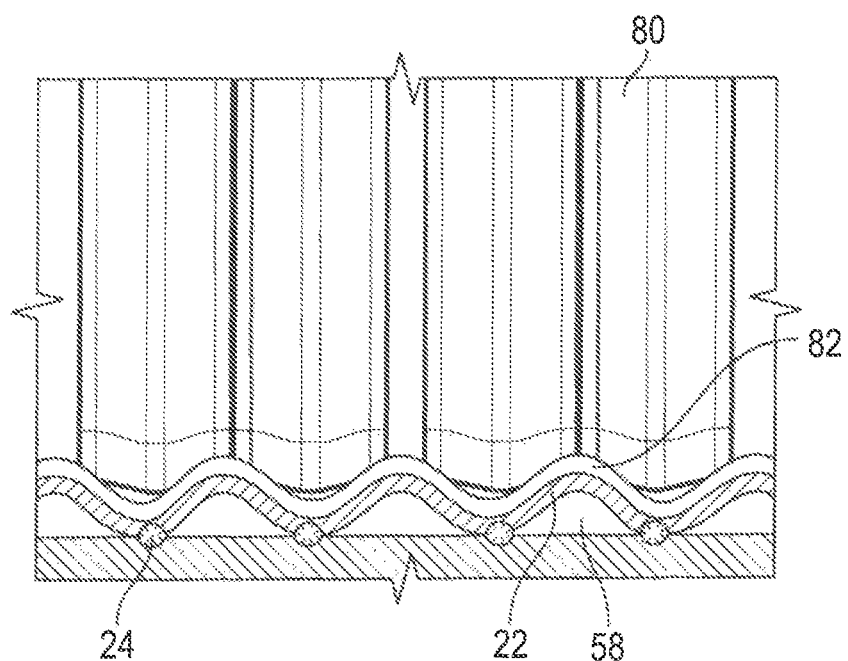
FIG. 12 is a cross-sectional view of a cooling plate in a battery.

The cooling channel 58 can traverse the cooling plate 50 on a first side, a second side, or both sides (for example, when the raised portions co-localize) at different locations in the flow field 4, FIG. 8. The flow field 4 can be configured such that the cooling channel 58 is defined by a raised portion of the first substrate 20 and the second substrate 22 co-localizing throughout the flow field 4, as illustrated in FIG. 6A and FIG. 6B. This embodiment can have the benefit of the respective raised portions having a reduced height, while forming an increased cooling channel height. Conversely, only one of the first substrate 20 and the second substrate 22 can include a raised portion that forms a cooling channel 58 in the cooling plate 50 for coolant flow. For example, one of the first substrate 20 and the second substrate 22 can include a raised portion and the other of the first substrate 20 and the second substrate 22 can be flat, as illustrated in FIG. 9, FIG. 11, and FIG. 12. This embodiment can be beneficial as only one of the first substrate 20 and the second substrate 22 would need to have the raised portion, potentially reducing the design complexity.

Figure 10:
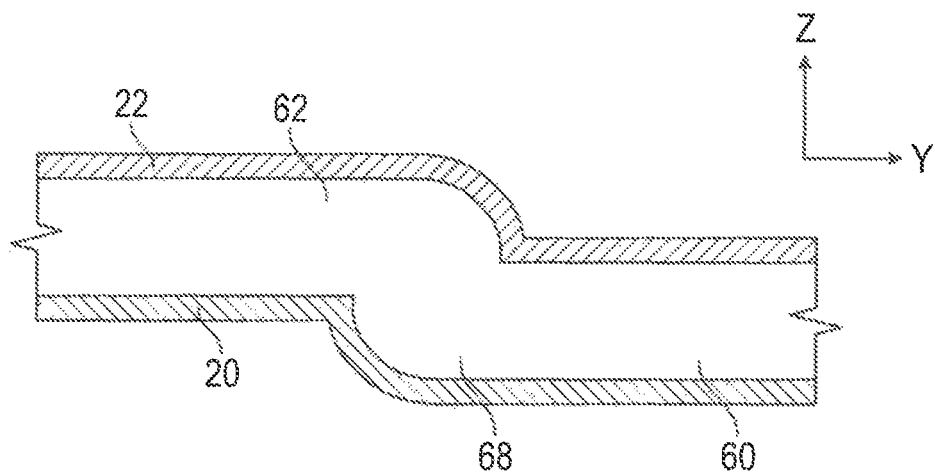
FIG. 10 is a cross-sectional view of a cooling plate.

The flow field 4 can be configured such that at least two separate cooling channels 58 are formed for separate coolant flow, where a first single-sided cooling channel 60, FIG. 9, is defined by a raised portion of the first substrate 20 and a second single-sided cooling channel 62 is defined by a raised portion of the second substrate 22. As illustrated in FIG. 10, the cooling channel can have a portion that is defined by a first single-sided cooling channel 60 defined by a raised portion in the first substrate 20 in some locations and a second single-sided cooling channel 62 defined by a raised portion of the second substrate 22 in other locations with a transfer location 68 provided for the coolant to traverse from one side to the other. This configuration can be formed using partially overlapping inflation tracks 46 in the respective platens 40 and 42 or by using substrates of varying thicknesses.

Although not illustrated, it is understood that the cooling plate 50 can comprise additional substrate layers. For example, the cooling plate 50 can comprise a third substrate located in between the first substrate 20 and the second substrate 22. The third substrate can be flat or can be inflated during the inflating. If deformed during the inflating, the topography of the third substrate can conform to at least one of the first substrate 20 or the second substrate 22 in some locations and can be different in other locations.

In order to increase the amount of coolant flow through the coolant channel 58, expanded coolant channels 66 can be formed, for example, as illustrated in FIG. 11. FIG. 11 illustrates that the expanded coolant channel 66 can have a width of two battery cells, when used in a battery application. The cooling channel 58 can have a width of one cell and the expanded coolant channel 66 can have a width of more than 1 to 6 cells, or more than 1 to 4 cells. The topography of the expanded coolant channel 66 can be formed via a corresponding surface of the inflation track 46. In general, the cooling channel 58 can have an average channel width of 1 to 60 millimeters, or 1 to 40 millimeters, or 1 to 10 millimeters, or 1 to 5 millimeters. The average channel width is the average width in the x,y plane perpendicular to the flow direction averaged along the height of the cooling channel 58.

Referring to FIG. 8, during use, a coolant can flow from the inlet 70 to the outlet 72 through the cooling channel 58. A pump, not shown, can circulate the coolant through the cooling plate 50. The cooling channel 58 can include one or more branch points 74 or one or more coalescing points 76 to form cooling channels 58 between the inlet 70 and the outlet 72. Each of the cooling channels 58 can further include various intermediate branch points that split into further conduits or can include various intermediate coalescing points where multiple conduits coalesce into a fewer number of conduits.

It is noted that the specific configuration of the flow field 4 defined by the cooling channel 58 and the number and location of the inlet(s) 70 and the outlet(s) 72 is not limited to the illustrated embodiments the figures. In general, the flow field 4 can be defined by one or more cooling channels 58 of various lengths, dimensions, and branching/coalescing points between the inlet(s) 70 and the outlet(s) 72. In this way, heat exchange of the cooling plate 50 can be symmetric, asymmetric, optimized for a particular region, or configured to be uniform across the cooling plate. Typically, the cooling channel 58 follows a tortuous path between the inlet(s) and the outlet(s), such as a serpentine path.

The cooling plate 50 can be configured to be electrically insulating to prevent electrical current between the coolant and other objects. For example, the cooling plate 50 can be placed in thermal contact with a battery cell by positioning the cooling plate 50 against the battery cell or positioning the cooling plate 50 between two battery cells. In this manner, the electrically insulating cooling plate 50 can prevent electrical current between the coolant and the battery cell(s) as well as prevent electrical current between flanking battery cells. The cooling plate 50 can be electrically insulating through the use of electrically insulating materials for forming films. The films can be formed from an electrically insulating material, for example, at least one of polypropylene, polyimide, or polycarbonate.

FIG. 11 and FIG. 12 illustrate embodiments of the cooling plate 50 in thermal contact with battery cells 80. Thermal contact is defined as meaning that heat can be transferred between the cooling plate 50 and the battery cells 80. FIG. 11 illustrates an advantage of the present cooling plate 50 in that it can be used to efficiently transfer heat from the battery cells 80 without the use of a thermal interface material. This advantage is significant in that heat transfer through the thermal interface material is not as efficient as merely transferring heat between the battery cells 80 and the cooling plate 58 and also in that thermal interface materials are expensive. This advantage arises from the fact that the present method of inflating the cooling plate 50 can result in more well defined cooling channels 58 that can more closely complement the surface of the battery cells 80. FIG. 12 illustrates that although the cooling plate 50 can closely complement the surface of the battery cells 80, an amount of the thermal interface material 82 can be used. It is noted though that a reduced amount of the thermal interface material 82 can be used to provide sufficient heat transfer as compared to the amount used in conventionally formed cooling plates formed by molding and brazing.

The first substrate 20 and the second substrate 22 can each independently comprise at least one of a metal or a polymer. The metal can comprise at least one of aluminum, magnesium, iron, copper, gold, silver, nickel, or stainless steel. The metal can comprise at least one of aluminum, iron, nickel, steel, or copper. The metal can comprise at least one of aluminum, magnesium, or copper. The metal can also comprise platings of one metal on another (for example, silver-plated copper), or bimetallic or layered metals (for example, aluminum and copper bonded sheets). The metal can comprise a partially recrystallized aluminum, which can facilitate uniform inflation of the cooling channel 58. The first substrate 20 and the second substrate 22 can each independently be metal plates, for example, comprising 90 to 100 weight percent, or 99 to 100 weight percent of the metal based on the total weight of the metal plate.

The first substrate 20 and the second substrate 22 can each independently comprise at least one of a silicone polymer, an elastomer, a polyolefin, a polyvinyl chloride, a polystyrene, a polyamide (for example, nylon), a polyimide, a polyurethane, or a polyester (for example, poly(ethylene terephthalate)). The first substrate 20 can comprise a metal such as aluminum and the second substrate 22 can comprise a polymer.

If one of the substrates 20, 22 comprises a polymer, it can further comprise at least one of a thermally conductive filler, a flame retardant, an anti-drip agent, or an impact modifier. The thermally conductive filler can comprise at least one of a metal (such aluminum) or a ceramic (such as alumina, (aluminum nitride), (boron nitride), silicon nitride, silicon carbide, or beryllium oxide). The flame retardant can comprise at least one of cyano melamine or magnesium hydroxide.

The cooling plate 50 can be suitable for use in a heat exchanger or temperature regulation system for a battery cell or a battery cell assembly. The cooling plate 50 can include a flow field 4 for circulating a coolant to maintain an operating temperature or operating temperature range for one or more battery cells. The cooling plate 50 can be one of a plurality of cooling plates 50, for example, where each cooling plate 50 can be in thermal contact with a battery cell in a battery cell assembly. Where the battery assembly includes a stack of battery cells, cooling plates 50 can be interleaved with the battery cells.

Depending on the material, the cooling plate 50 can withstand internal operating pressures up to 500 kilopascal (kPa), or 70 to 400 kPa. The maximum internal operating pressure that the cooling plate 50 can withstand can be determined by sealing all but one of the inlets 70 and outlets 72 and increasing a coolant pressure in the cooling channel 58 at a rate of less than or equal to 10 kPa per minute and determining the coolant pressure at which a failure occurs. An example of a failure includes leaking of the coolant into the non-inflated regions 28 proximal to a conduit area between the first substrate 20 and the second substrate 22.

When used as a coolant plate for a battery assembly, the battery assembly can be configured to supply high voltage direct current (DC) power to an inverter, which can include a three-phase circuit coupled to a motor to convert the DC power to alternating current (AC) power. In this regard, the inverter can include a switch network having an input coupled to the battery assembly and an output coupled to the motor. The switch network can include various series switches (for example, insulated gate bipolar transistors (IGBTs) within integrated circuits formed on semiconductor substrates) with antiparallel diodes (for example, antiparallel to each switch) corresponding to each of the phases of the motor. The battery assembly can include voltage adaption or transformation, such as DC/DC converters. One or more battery assemblies can be distributed within a vehicle where each battery assembly can be made up of a number of battery cells. The battery cells can be connected in series or parallel to collectively provide voltage to the inverter.

The battery assembly can be cooled by a coolant that flows through the flow field 4 via a coolant loop including one or more cooling plates 50. The coolant can flow into one or more inlets 70 of the cooling plate 50 in thermal contact with the battery assembly to exchange heat with the battery cells. The coolant can then flow through one or more outlets 72 of the cooling plate 50. The fluid can then be recirculated through a coolant loop. Although the fluid in the coolant channel 58 is referred to herein as a "coolant," it is noted that the coolant can heat or cool various components within the vehicle, including in the battery assembly.

The coolant can include any liquid that absorbs or transfers heat to cool or heat an associated component, such as water and/or ethylene glycol (i.e., "antifreeze"). The coolant can comprise at least one of air, nitrogen, water, ethylene glycol, ethanol, methanol, or ammonia. When in use, a liquid flow rate of the liquid coolant through the conduit 42 can be 1 to 15 liters per minute for and a gas flow rate of the gas coolant through the conduit 42 can be 200 to 300 meters cubed per hour.

When used in a vehicle, the battery pack or packs can be located in the front, middle, or rear of the vehicle. The battery pack or packs can be coupled to the bottom of the vehicle. Additionally or alternatively, the cooling plate 50 can be used in a cooling system for cooling in computer applications within and/or outside of the vehicle, where thermal conduction is required between interfaces. When used in a vehicle, the battery pack or packs can comprise a lithium-ion battery, for example, for use as a battery for a vehicle with a hybrid drive or a fuel cell vehicle.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context.

Reference throughout the specification to "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. The endpoints of all ranges directed to the same component or property are inclusive of the endpoints, are independently combinable, and include all intermediate points and ranges. For example, a range of "5 to 20 millimeters" is inclusive of the endpoints and all intermediate values of the ranges of such as 10 to 23 millimeters, etc.). The suffix "(s)" as used herein is intended to include both the singular and the plural of the term that it modifies, thereby including one or more of that term (e.g., the colorant(s) includes one or more colorants). The terms "first," "second," and the like, as used herein do not denote any order, quantity, or importance, but rather are used to distinguish one element from another. The term "at least one of" means that the list is inclusive of each element individually, as well as combinations of two or more elements of the list, and combinations of at least one element of the list with like elements not named Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of forming a cooling plate, comprising:
    laser welding a plurality of weld lines to physically connect a first substrate and a second substrate wherein the plurality of weld lines forms an inflatable track therebetween; and
    inflating the inflatable track with an inflation fluid wherein one of the first substrate and the second substrate does not deform under the inflation conditions due to thickness of that substrate or inflating occurs in an inflation device comprising a first platen and a second platen located on either side of the physically connected first and second substrates; wherein the first platen comprises a first platen inflation track and the second platen comprises a second platen inflation track the first platen inflation track and the second platen inflation track partially overlap to form a cooling channel in the cooling plate.

2. The method of claim 1, further comprising stacking the first substrate and the second substrate in between a support layer and a laser guide layer; wherein the laser guide layer comprises an open track forming a laser guide; and wherein the laser welding comprises laser welding along the laser guide.

3. The method of claim 2, further comprising, during the laser welding, applying a compressive force to the first substrate and the second substrate via the support layer and the laser guide layer.

4. The method of claim 1, wherein the inflation fluid comprises at least one of a gas or a liquid.

5. The method of claim 1, wherein the inflation fluid has a temperature of 23 to 1,000° C.

6. The method of claim 1, wherein the inflating occurs at an inflation pressure of 10 to 100 psi.

7. The method of claim 1, wherein the inflating comprises inflating a free-standing welded substrate.

8. The method of claim 1, wherein the inflating comprises inflating the welded substrate in an inflation device comprising a first platen and a second platen located on either side of the welded substrate; wherein at least one of the first platen or the second platen comprises an inflation track corresponding to the inflatable track.

9. The method of claim 1, wherein the inflating comprises utilizing an exhaust valve with constriction to provide a back pressure during the inflating.

10. The method of claim 1, wherein at least one of the first substrate or the second substrate comprises at least one of aluminum, magnesium, or steel.

11. The method of claim 10, wherein at least one of the first substrate or the second substrate comprises a partially recrystallized aluminum.

12. The method of claim 1, wherein the cooling channel has at least one of a channel width of 1 to 60 millimeters or a channel height of 1 to 6 millimeters.

13. The method of claim 1, wherein at least one of the first substrate or the second substrate has a thickness of 0.05 to 10 millimeters.

14. The method of claim 1, wherein one of the first substrate or the second substrate comprises a raised portion and the other of the first substrate and second substrate is flat.

15. The method of claim 1, wherein the first substrate comprises a first raised portion and the second substrate comprises a second raised portion wherein the first raised portion and the second raised portion are not co-localized, forming separate cooling channels in at least an area of the cooling plate.

16. The method of claim 1 wherein the first substrate and the second substrate have different thicknesses, the first substrate and the second substrate comprise different materials selected from metal and polymer; or both.

17. The method of claim 1 wherein a third substrate is located between the first substrate and the second substrate.

* * * * *